(12) United States Patent
Fujita

(10) Patent No.: US 9,643,643 B2
(45) Date of Patent: May 9, 2017

(54) EXTENSIBLE ACTUATOR CONTROL METHOD, EXTENSIBLE ACTUATOR, AND STEERING DEVICE

(71) Applicant: Showa Corporation, Gyoda-shi (JP)

(72) Inventor: Hiroshi Fujita, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 116 days.

(21) Appl. No.: 14/629,914

(22) Filed: Feb. 24, 2015

(65) Prior Publication Data

US 2016/0121922 A1 May 5, 2016

(30) Foreign Application Priority Data

Oct. 30, 2014 (JP) .................. 2014-221685

(51) Int. Cl.
| | |
|---|---|
| B62D 5/04 | (2006.01) |
| F16H 25/04 | (2006.01) |
| F16H 25/20 | (2006.01) |
| F16H 25/22 | (2006.01) |
| B62D 7/14 | (2006.01) |
| B60G 3/20 | (2006.01) |
| F16H 25/24 | (2006.01) |

(52) U.S. Cl.
CPC ............ *B62D 5/0421* (2013.01); *B60G 3/20* (2013.01); *B62D 5/0448* (2013.01); *B62D 5/0475* (2013.01); *B62D 7/146* (2013.01); *B60G 2200/144* (2013.01); *B60G 2200/44* (2013.01); *F16H 25/2214* (2013.01); *F16H 25/2454* (2013.01); *F16H 2025/209* (2013.01); *F16H 2025/2084* (2013.01)

(58) Field of Classification Search
CPC ..... B62D 5/0421; B62D 7/148; B62D 7/1581
USPC .................................................. 180/444, 445
See application file for complete search history.

(56) References Cited

U.S. PATENT DOCUMENTS

| | | | | |
|---|---|---|---|---|
| 7,129,658 | B2* | 10/2006 | Ether .................... | B60T 8/1703 188/156 |
| 8,516,914 | B2* | 8/2013 | Osterlanger .......... | B60G 7/006 188/129 |
| 8,943,916 | B2* | 2/2015 | Osterlaenger ......... | B60G 7/006 192/223.4 |
| 2011/0073404 | A1* | 3/2011 | Coleman ................. | B62D 5/04 180/444 |
| 2012/0118663 | A1* | 5/2012 | Mori ................. | B60R 25/02153 180/444 |
| 2012/0319374 | A1* | 12/2012 | Watanabe ................ | B62D 6/02 280/91.1 |
| 2013/0340563 | A1* | 12/2013 | Yamanaka ............. | B62D 7/148 74/533 |
| 2014/0034411 | A1* | 2/2014 | Sandholzer ....... | B60R 25/02107 180/444 |

FOREIGN PATENT DOCUMENTS

JP    2009-243621 A    10/2009

* cited by examiner

*Primary Examiner* — Tony Winner
(74) *Attorney, Agent, or Firm* — Leason Ellis LLP

(57) ABSTRACT

An extensible actuator includes a motor, a rod, a conversion unit and an electromagnetic braking system. The motor generates rotating force. The rod freely reciprocates in an axial direction. The conversion mechanism converts the rotating force of the motor into a reciprocating motion of the rod. The electromagnetic braking system brakes the reciprocating motion of the rod.

10 Claims, 9 Drawing Sheets

EXTENSIBLE ACTUATOR CONTROL METHOD, EXTENSIBLE ACTUATOR, AND STEERING DEVICE

CROSS-REFERENCE TO RELATED APPLICATIONS

This application is based on and claims priority under 35 USC 119 from Japanese Patent Application No. 2014-221685 filed on Oct. 30, 2014, the content of which is incorporated herein by reference.

BACKGROUND OF THE INVENTION

1. Technical Field

The present invention relates to an extensible actuator control method, an extensible actuator, and a steering device.

2. Related Art

For example, Patent Literature 1 (JP-A-2009-243621) proposes an extensible actuator as a technique of steering the rear wheel of a vehicle. This extensible actuator steers the rear wheel by causing a rod to reciprocate in a vehicle width direction with a rotating force of a motor.

However, in the technique of Patent Literature 1, when a vehicle travels along a groove while riding on a curb so that an external force is applied to the rear wheel, the rod may move and the toe angle of the rear wheel may change.

SUMMARY OF THE INVENTION

An object of the present invention is to provide an extensible actuator control method, an extensible actuator, and a steering device capable of preventing a rod from moving with external force easily.

An aspect of the present invention provides an extensible actuator control method for an extensible actuator. The extensible actuator includes: a motor that generates rotating force; a rod that freely reciprocates in an axial direction; a conversion mechanism that converts the rotating force of the motor into a reciprocating motion of the rod; an electromagnetic braking system that brakes the reciprocating motion of the rod; and a controller that controls the motor and the electromagnetic braking system. The method includes: starting position holding control of holding a position of the rod; outputting a brake release signal to the electromagnetic braking system; releasing the position holding control after the braking by the electromagnetic braking system is released; and driving the motor and moving the rod.

According to such a configuration, it is possible to brake the reciprocating motion of the rod using the electromagnetic braking system. As a result, the rod is prevented from moving easily.

Here, the electromagnetic braking system is a system that generates braking force when the movable core moves with the electromagnetic force thereof. Thus, as will be described in an embodiment, a predetermined release period (for example, 20 ms to 30 ms) is required until a braking state changes to a non-braking state (that is, until the release of the braking state is completed after the release of the braking state starts). The rod may move if external force acts on the rod during this release period.

Thus, according to such a configuration, position holding control of holding the position of the rod starts. Subsequently, in a state where the position of the rod is held in this manner, a brake release signal is output to the electromagnetic braking system, and the held position of the rod by the position holding control is released after the braking of the electromagnetic braking system is released. In this manner, since the position of the rod is held by the position holding control when the braking of the electromagnetic braking system is released, even when external force is input to the rod, the rod cannot move easily but is held at the present position.

After that, when the motor is driven, it is possible to move the rod ideally.

Moreover, the position holding control may include short-circuiting the motor to hold the position of the rod.

Moreover, the position holding control may include setting a present position of the rod as a target position and operating the motor so that the rod remains at the target position, thereby holding the position of the rod.

Moreover, in response to the rod reciprocating, a wheel of a vehicle may be steered.

Another aspect of the present invention provides an extensible actuator including: a motor that generates rotating force; a rod that freely reciprocates in an axial direction; a conversion mechanism that converts the rotating force of the motor into a reciprocating motion of the rod; and an electromagnetic braking system that brakes the reciprocating motion of the rod.

Moreover, the conversion mechanism may include a worm that is fixed to an output shaft of the motor, a worm wheel that engages with the worm, and a ball screw that converts a rotational motion of the worm wheel into a reciprocating motion of the rod, and the ball screw may include a nut that rotates integrally with the worm wheel and a screw rod that reciprocates integrally with the rod in response to the nut rotating.

Moreover, the extensible actuator may further include a controller that controls the motor and the electromagnetic braking system, in which the controller may execute: starting position holding control of holding a position of the rod; outputting a brake release signal to the electromagnetic braking system; releasing the position holding control after the braking by the electromagnetic braking system is released; and driving the motor and moving the rod.

Another aspect of the present invention provides a steering device including the extensible actuator, in which, in response to the rod reciprocating, a wheel of a vehicle is steered.

According to any one of the aspects of the present invention, it is possible to provide an extensible actuator control method, an extensible actuator, and a steering device capable of preventing a rod from moving with external force easily.

DETAILED DESCRIPTION OF THE INVENTION

Figure 1:
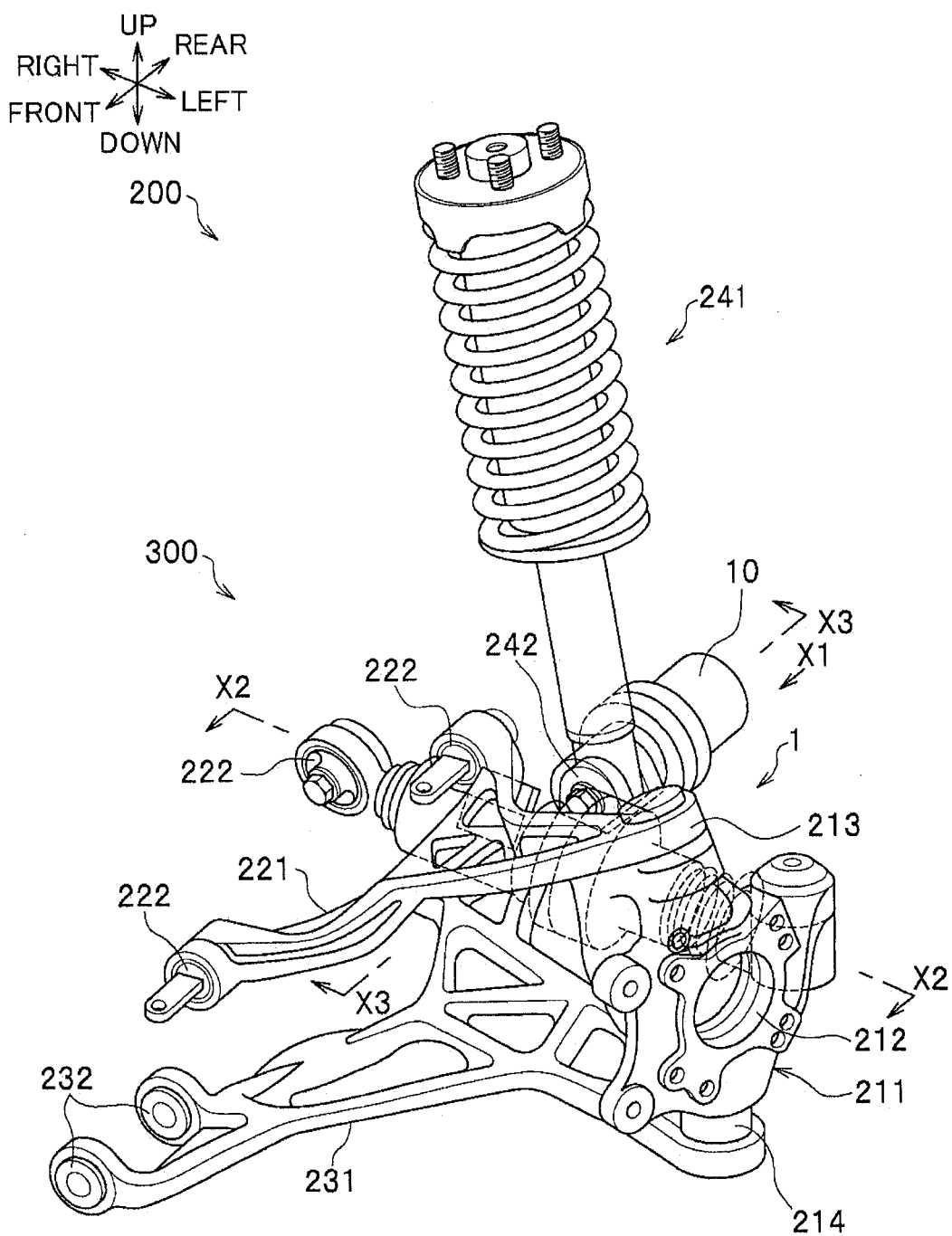
FIG. 1 is a perspective view of a steering device according to the present embodiment.
Figure 2:
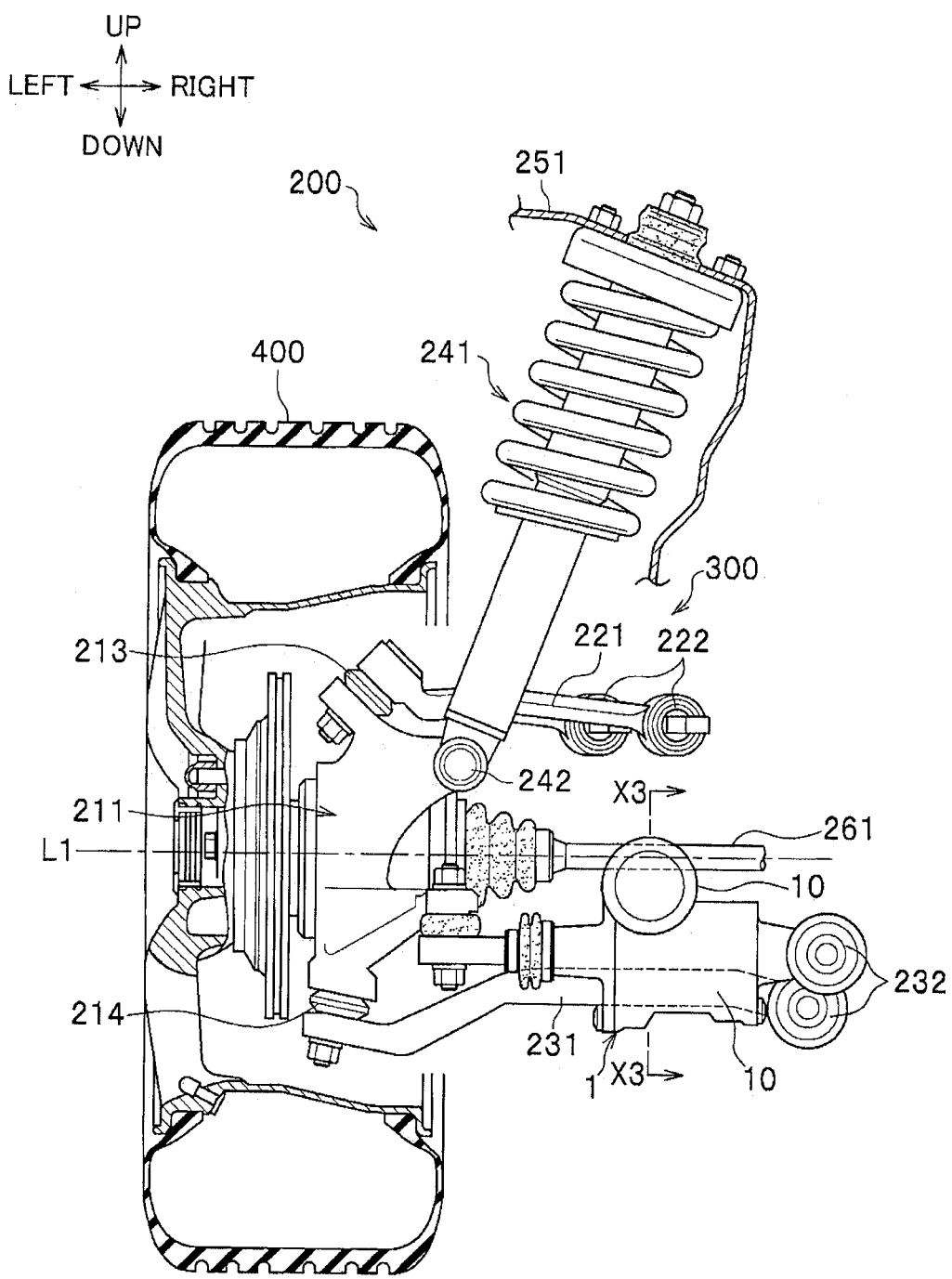
FIG. 2 is a rear view of the steering device according to the present embodiment and is a view along arrow X1 in FIG. 1.

An embodiment of the present invention will be described with reference to FIGS. 1 to 8. A configuration in which the present invention is applied to a suspension system (suspension device) of a rear wheel 400 on the left side of a vehicle is illustrated. That is, the right side has the same configuration as the left side, and the rear wheel 400 on the left side and the rear wheel on the right side are steered independently by an extensible actuator 1 (a steering device 300) described later.

Configuration of Suspension System

A suspension system 200 according to the present embodiment is a suspension system of the rear wheel 400 of a front-engine front-drive (FF), four-wheel steering, and four-wheel drive vehicle and is a double wishbone suspension system. The suspension system 200 includes a knuckle 211 that rotatably supports the rear wheel 400 (wheel), an upper arm 221 and a lower arm 231 that connect the knuckle 211 to a vehicle body (not illustrated) so that the knuckle 211 can move up and down, a damper 241 that buffers the impact of a vertical movement of the rear wheel 400, and the extensible actuator 1.

The knuckle 211 is a member having a frame shape in a side view and an insertion hole 212 is formed at the center of the knuckle 211. An axle (not illustrated) that rotates integrally with the rear wheel about an axial line L1 is inserted into the insertion hole 212. The axle is connected to a drive shaft 261 (see FIG. 2) with a universal joint (not illustrated) interposed.

An upper part of the knuckle 211 is turnably connected to a distal end of the upper arm 221 with a ball joint 213 interposed. A lower part of the knuckle 211 is rotatably connected to a distal end of the lower arm 231 with a ball joint 214 interposed. When the knuckle 211 rotates about the ball joint 213 and the ball joint 214, a toe angle of the rear wheel 400 changes.

A base end of the upper arm 221 is turnably attached to the vehicle body (not illustrated) with two bushings 222 interposed. A base end of the lower arm 231 is rotatably attached to the vehicle body (not illustrated) with two bushings 232 interposed.

The damper 241 is a hydraulic damper (hydraulic buffer) with spring. A lower part of the damper 241 is connected to the knuckle 211 with a bushing 242 interposed. An upper part of the damper 241 is fixed to the vehicle body 251.

Configuration of Extensible Actuator

The extensible actuator 1 will be described with reference to FIGS. 3 to 8.

The extensible actuator 1 is an extensible device that extends in a left-right direction (vehicle width direction) and that turns the knuckle 211 to change the toe angle of the rear wheel 400. That is, the steering device 300 that steers the rear wheel 400 is configured to include the extensible actuator 1, the knuckle 211 that rotatably supports the rear wheel 400, and the upper arm 221 and the lower arm 231 that rotatably support the knuckle 211.

The extensible actuator 1 includes a motor 10, a worm 20, a worm wheel 30, a ball screw 40, a rod 50, an electromagnetic braking system 60, and a housing 70. Here, in the present embodiment, a conversion mechanism that converts the rotating force of the motor 10 into a reciprocating motion of the rod 50 is configured to include the worm 20, the worm wheel 30, and the ball screw 40.

Motor

Figure 4:
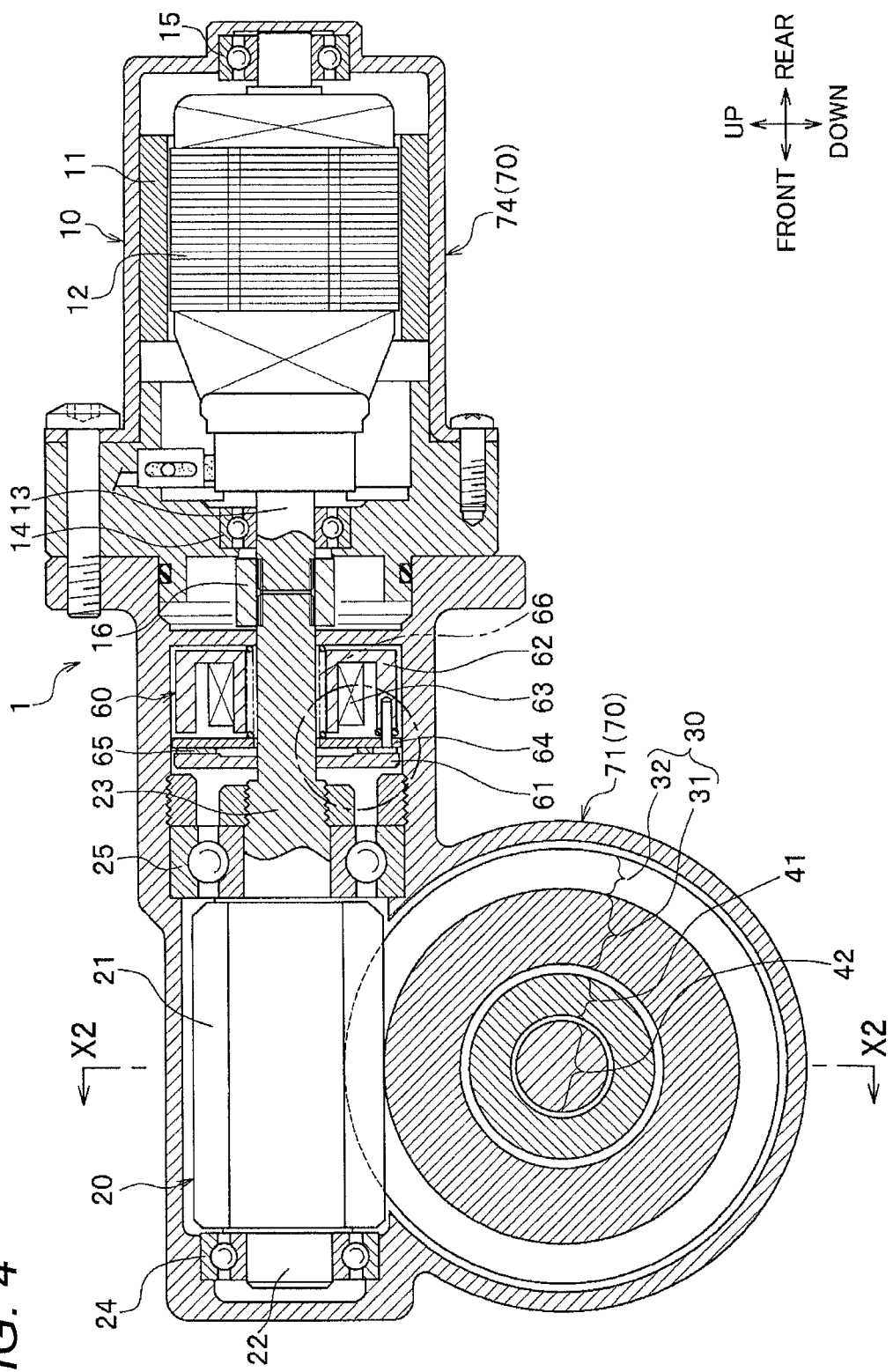
FIG. 4 is a longitudinal sectional view of an extensible actuator according to the present embodiment and is a sectional view along line X3-X3 in FIGS. 1 and 3.

The motor 10 is an electric DC motor with a brush that generates a rotating force which is a driving force according to an instruction of an ECU 130 (see FIG. 4). Moreover, the motor 10 has a function of holding its output shaft 13 at the present position when a motor driving circuit 110 is short-circuited as will be described later.

The motor 10 includes a non-rotation-side stator 11 that is disposed on the outer side in the radial direction and has a cylindrical shape, a rotation-side rotor 12 that is disposed on the inner side in the radial direction of the stator 11 and has a columnar shape, and the output shaft 13 that is fixed onto the axial line of the rotor 12. When DC power is supplied to the rotor 12 via a brush (not illustrated), the rotor 12 rotates in a normal or reverse direction so as to correspond to the conduction direction (see FIG. 7).

The output shaft 13 extends in a front-rear direction, the front end of the output shaft 13 is rotatably supported by a fourth housing 74 with a bearing 14 interposed, and the rear end of the output shaft 13 is rotatably supported by the fourth housing 74 with a bearing 15 interposed. The front end of the output shaft 13 is coupled with the rear end of a second shaft portion 23 described later with a cylindrical coupling 16 interposed and the output shaft 13 rotates integrally with the second shaft portion 23 (the worm 20).

Worm

The worm 20 is a rive gear that extends in the front-rear direction and rotates integrally with the output shaft 13 of the motor 10 (see FIG. 4). The worm 20 includes a worm body 21 in which gear teeth are formed on an outer circumferential surface thereof, a first shaft portion 22 that extends toward the front side from the worm body 21, and the second shaft portion 23 that extends toward the rear side from the worm body 21. The first shaft portion 22 is rotatably supported by a first housing 71 with a first bearing 24 interposed and the second shaft portion 23 is rotatably supported by the first housing 71 with a second bearing 25 interposed.

The worm body 21 engages with a wheel tooth portion 32 of the worm wheel 30. When the worm body 21 (the worm 20) rotates, the wheel tooth portion 32 (the worm wheel 30) rotates.

Worm Wheel

The worm wheel 30 includes a hub portion 31 that is spline-coupled to an outer circumferential surface of a nut 41 described later and the wheel tooth portion 32 which extends toward the outer side in the radial direction from the hub portion 31 and in which gear teeth are formed on an outer circumferential surface thereof.

Ball Screw

Figure 3:
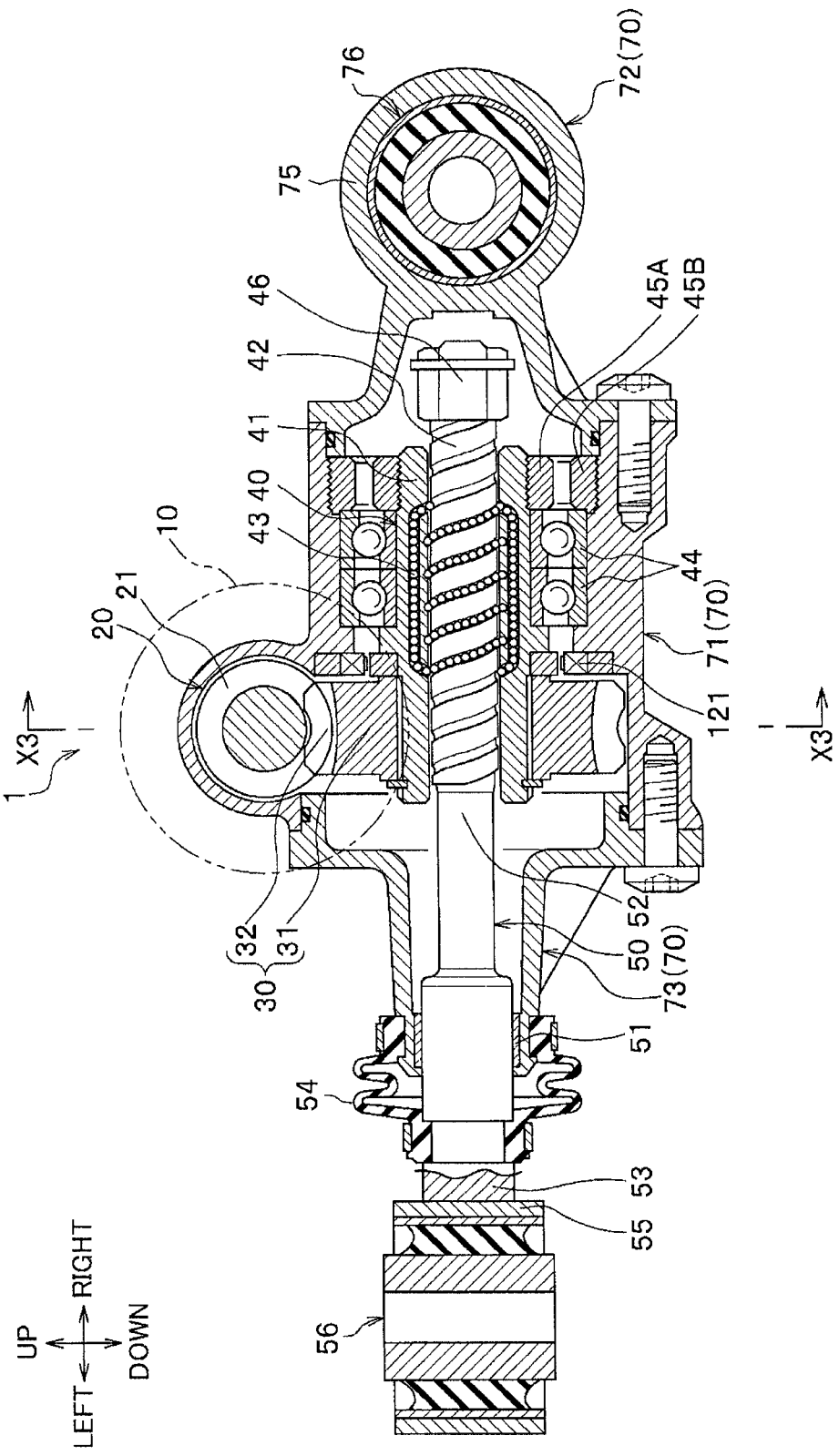
FIG. 3 is a cross-sectional view of the steering device according to the present embodiment and is a sectional view along line X2-X2 in FIG. 1.

The ball screw 40 includes a cylindrical nut 41, a screw rod 42 that passes through the nut 41, and a plurality of balls 43 that rolls between the nut 41 and the screw rod 42 (see FIG. 3). The ball screw 40 is configured such that the balls 43 circulate in the nut 41.

The nut 41 is rotatably supported by the first housing 71 with two bearings 44 interposed. A ring-shaped lock nut 45A which is screwed to the outer circumferential surface of the nut 41 is in contact with the inner ring of the right-side bearing 44. A ring-shaped lock nut 45B which is screwed to the inner circumferential surface of the first housing 71 is in contact with the outer ring of the right-side bearing 44.

When the worm wheel 30 and the nut 41 rotate, the screw rod 42 moves in the left-right direction so as to correspond to the rotation direction. A nut 46 that prevents removal is screwed to an inner end in the vehicle width direction of the screw rod 42. When the screw rod 42 moves toward the outer side in the vehicle width direction, the extensible actuator 1 extends and the rear wheel 400 turns toward a toe-in side. On the other hand, when the screw rod 42 moves toward the inner side in the vehicle width direction, the extensible actuator 1 compresses and the rear wheel 400 turns toward a toe-out side.

Rod

The rod 50 is a rod-shaped member disposed so as to freely reciprocate in the left-right direction (axial direction) (see FIG. 3). Specifically, the rod 50 is supported on a second housing 72 with a cylindrical collar 51 interposed so as to freely slide in the left-right direction.

In the vehicle width direction, an inner end 52 of the rod 50 is fixed to the screw rod 42. Due to this, the rod 50 and the screw rod 42 reciprocate integrally. An outer end 53 of the rod 50 protrudes toward the outer side in the vehicle width direction from the second housing 72. A boot 54 made from elastically deformable rubber is attached so as to block the gap between the outer end 53 and the second housing 72.

A cylindrical portion 55 is fixed to the outer end 53 of the rod 50. The rod 50 is turnably connected to the knuckle 211 with a bushing 56 accommodated in the cylindrical portion 55 interposed.

Electromagnetic Braking System

Figure 5A:
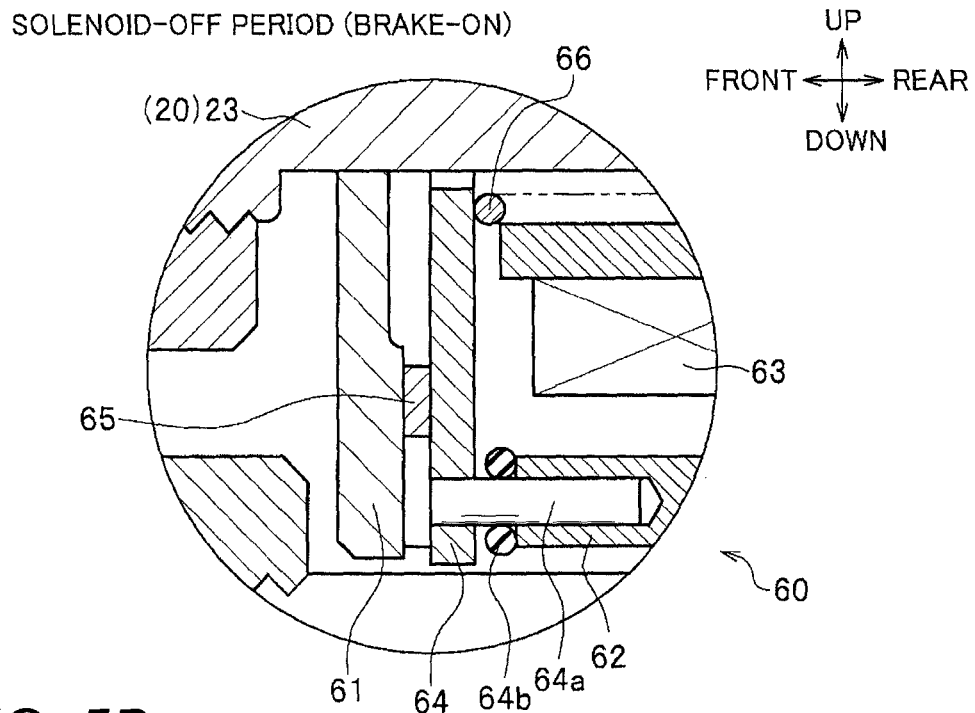
FIG. 5A is a sectional view during brake-ON (solenoid-OFF) of an electromagnetic braking system according to the present embodiment and FIG. 5B is a sectional view during brake-OFF (solenoid-ON) of the electromagnetic braking system according to the present embodiment.
Figure 5B:
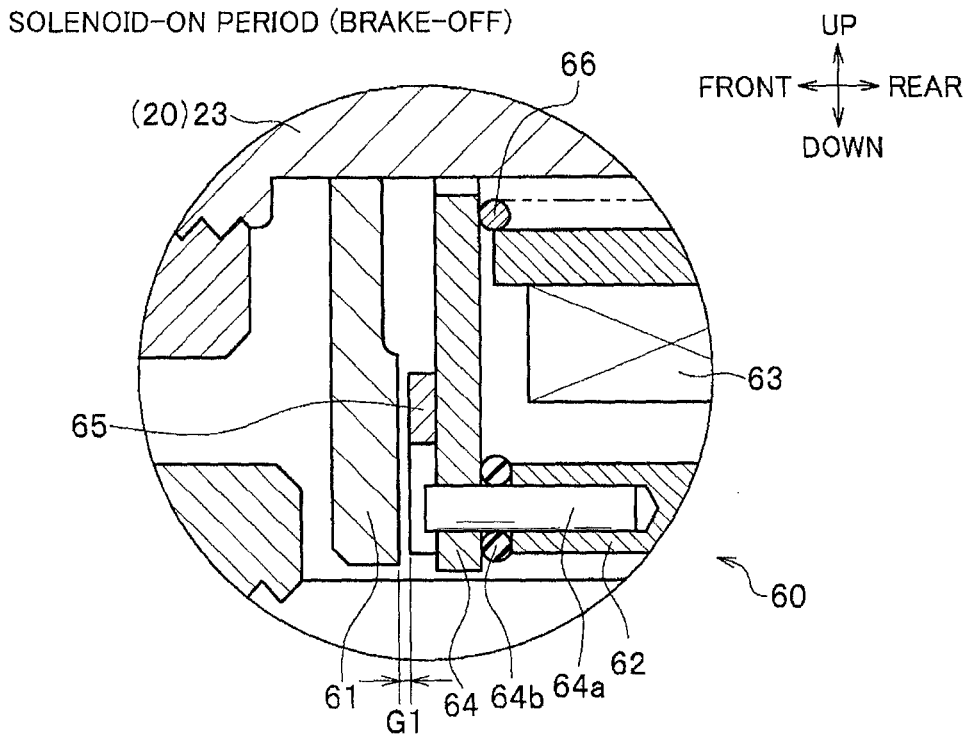

The electromagnetic braking system 60 stops the rotation of the worm 20 (the first shaft portion 22) so that the worm 20 (the first shaft portion 22) is held at a desired position in the circumferential direction, the extensible actuator 1 is held at a desired length, and the rear wheel 400 is held at a desired toe angle (see FIG. 4 and FIGS. 5A and 5B). The electromagnetic braking system 60 includes a disc 61, a fixed core 62, a solenoid 63, a movable core 64 (armature), a brake shoe 65, and a compression coil spring 66. When the solenoid 63 is in an OFF state (non-conduction state), the brake shoe 65 makes close contact with the disc 61, and the electromagnetic braking system 60 generates braking force (see FIG. 5A).

The disc 61 is a member that is coaxially fixed to the first shaft portion 22 so as to rotate integrally with the first shaft portion 22.

The fixed core 62 is formed of a magnetic material and is magnetized by the solenoid 63 to generate attractive force that attracts the movable core 64 while resisting against the spring force of the compression coil spring 66. When the fixed core 62 attracts the movable core 64, the brake shoe 65 fixed to the movable core 64 is separated from the disc 61 in the left-right direction (see FIG. 5B), a gap G1 is formed between the brake shoe 65 and the disc 61, and the braking is released. Moreover, since such electromagnetic attraction is employed, a predetermined release period (armature attraction period) is required from the start of electric conduction to the solenoid 63 (start of brake release) to the completion (completion of brake release) of the separation of the brake shoe 65.

The solenoid 63 is connected to an external power supply via a relay (not illustrated) which is turned on and off by the ECU 130. When the ECU 130 puts the solenoid 63 into a conduction state, the solenoid 63 generates magnetic field and the fixed core 62 is magnetized.

The movable core 64 is a ring-shaped member formed of a magnetic material and is guided in the front-rear direction by a pin 64a. A buffer member 64b made from rubber is disposed between the movable core 64 and the fixed core 62 so as to reduce collision noise generated by the movable core 64 and the fixed core 62.

The brake shoe 65 is fixed to a front surface (the surface close to the rotor) of the movable core 64 so as to make close contact with the disc 61 during an OFF period (brake-ON period) of the solenoid 63 to generate braking force.

The compression coil spring 66 is a biasing member that biases the movable core 64 and the brake shoe 65 toward the disc 61 with the spring force thereof.

Housing

The housing 70 is a casing that forms an outer casing of the extensible actuator 1 and includes the first housing 71, the second housing 72, the third housing 73, and the fourth housing 74. The housing 70 is formed when the first housing 71 and the like are fastened together by bolts and the like.

The first housing 71 is a cylindrical member that extends in the left-right direction (see FIG. 3). The first housing 71 accommodates the worm 20, the worm wheel 30, and the ball screw 40.

The second housing 72 is a bottomed cylindrical member that is attached to the inner side in the vehicle width direction of the first housing 71 and has a bottom on the inner side in the vehicle width direction (see FIG. 3). A cylindrical portion 75 is fixed to the inner side in the vehicle width direction of the second housing 72. The second housing 72 is turnably connected to the vehicle body (not illustrated) with a bushing 76 accommodated in the cylindrical portion 75 interposed.

The third housing 73 is a cylindrical member attached to the outer side in the vehicle width direction of the first housing 71 (see FIG. 3). The third housing 73 accommodates the rod 50 so that the rod 50 can freely slide in the left-right direction.

The fourth housing 74 is a bottomed cylindrical member that is attached to the rear side of the first housing 71 and has a bottom wall on the rear side (see FIG. 4). The fourth housing 74 accommodates the motor 10.

Figure 6:
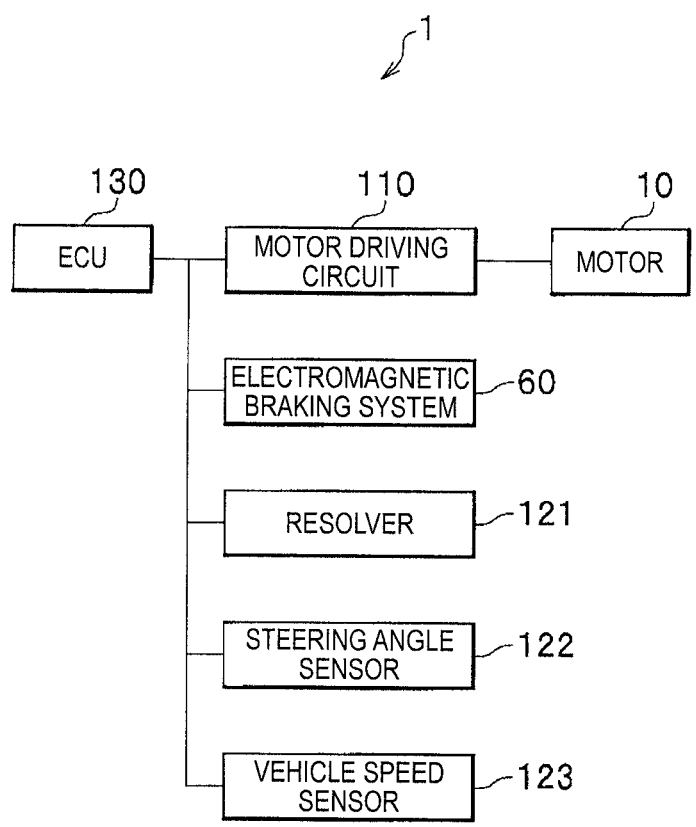
FIG. 6 is a block diagram illustrating an electrical configuration of the extensible actuator according to the present embodiment.

As illustrated in FIG. 6, the extensible actuator 1 includes a motor driving circuit 110, a resolver 121 (see FIG. 3), a steering angle sensor 122, a vehicle speed sensor 123, and the ECU 130 (electronic control unit, controller) electrically connected to these components. The ECU 130 is also electrically connected to the electromagnetic braking system 60.

Motor Driving Circuit

Figure 7:
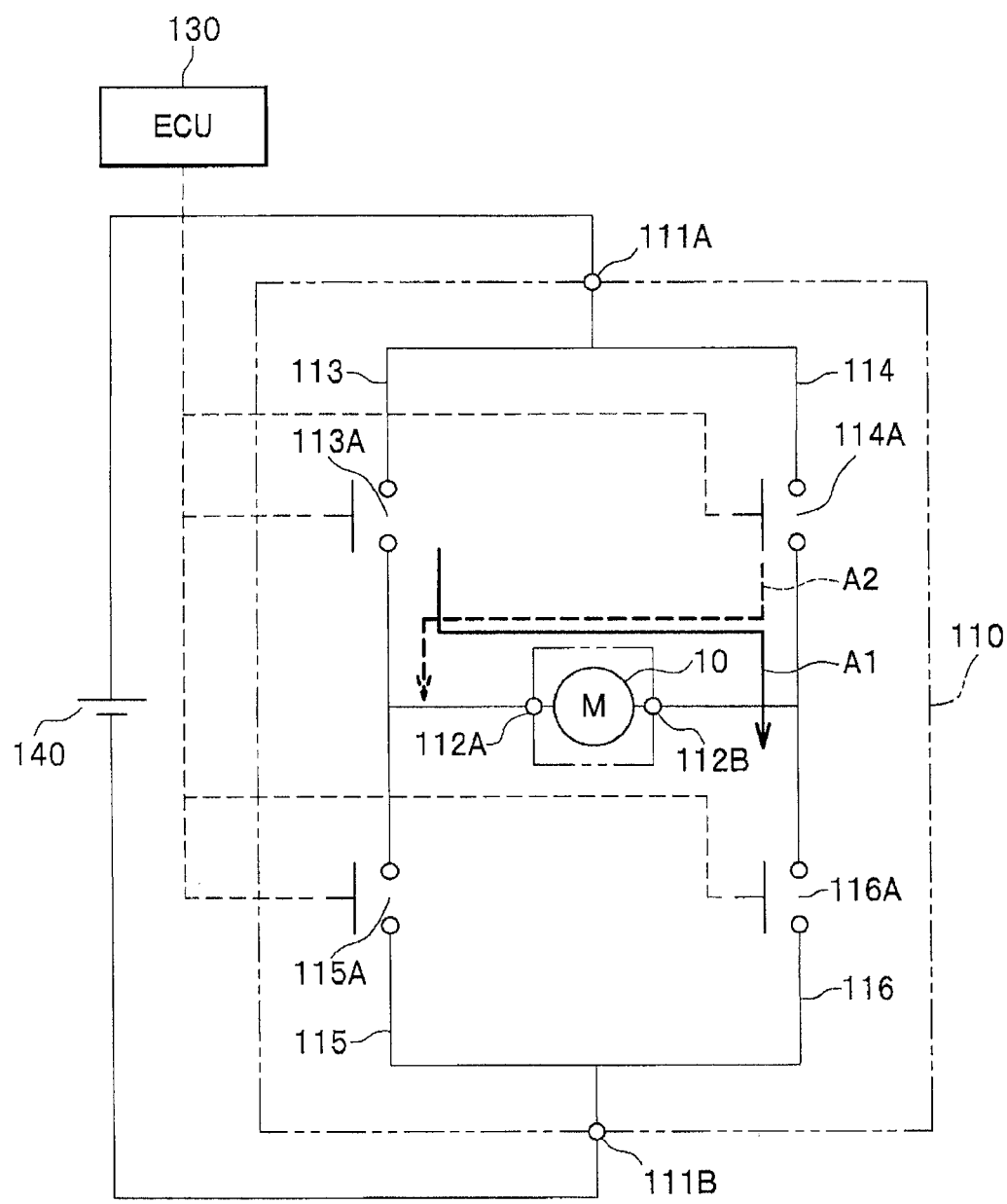
FIG. 7 is a circuit diagram of a motor driving circuit according to the present embodiment.

As illustrated in FIG. 7, the motor driving circuit 110 is an H-type bridge circuit that supplies DC power from a DC power supply 140 to the motor 10 according to an instruction of the ECU 130 to drive the motor 10. The motor driving circuit 110 includes a first power-side terminal 111A and a second power-side terminal 111B connected to the DC power supply 140, a first motor-side terminal 112A and a second motor-side terminal 112B connected to the motor 10, a first connection line 113 to a fourth connection line 116, and a first relay 113A to a fourth relay 116A that are turned on and off by the ECU 130.

The first connection line 113 connects the first power-side terminal 111A and the first motor-side terminal 112A. The first relay 113A is provided in the first connection line 113.

The second connection line 114 connects the first power-side terminal 111A and the second motor-side terminal 112B. The second relay 114A is provided in the second connection line 114.

The third connection line 115 connects the second power-side terminal 111B and the first motor-side terminal 112A. The third relay 115A is provided in the third connection line 115.

The fourth connection line 116 connects the second power-side terminal 111B and the second motor-side terminal 112B. The fourth relay 116A is provided in the fourth connection line 116.

When the ECU 130 turns on the first and fourth relays 113A and 116A and turns off the second and third relays 114A and 115A, DC power flows in the normal direction to put the motor 10 into a conduction state (see arrow A1), and the motor 10 rotates in the normal direction.

When the ECU 130 turns on the second and third relays 114A and 115A and turns off the first and fourth relays 113A and 116A, DC power flows in the reverse direction to put the motor 10 into a conduction state (see arrow A2), and the motor 10 rotates in the reverse direction.

When the ECU 130 turns on the first and second relays 113A and 114A and turns off the third and fourth relays 115A and 116A, the motor driving circuit 110 is short-circuited so that the first power-side terminal 111A and the second power-side terminal 111B are at the same potential level and short brake (short braking force) acts on the motor 10. That is, when short brake acts on the motor 10 in this manner, the rotor 12 and the output shaft 13 are held at the present positions. As a result, the worm 20, the worm wheel 30, the nut 41, the screw rod 42, and the rod 50 are held at the present positions.

Similarly, when the ECU 130 turns on the third and fourth relays 115A and 116A and turns off the first and second relays 113A and 114A, the motor driving circuit 110 is short-circuited so that the first power-side terminal 111A and the second power-side terminal 111B are at the same potential level and short brake (short braking force) acts on the motor 10.

Resolver

The resolver 121 is a sensor that detects a rotation angle of the nut 41 that forms the ball screw 40 (see FIG. 3). The resolver 121 outputs the rotation angle to the ECU 130. Here, since the rotation angle of the nut 41 is synchronous with the stroke amount of the screw rod 42 and the rod 50 and the rotation angle of the output shaft 13 of the motor 10, the ECU 130 can detect the stroke amount (the position in the axial direction) of the screw rod 42 and the rod 50 and the rotation angle (the position in the circumferential direction) of the output shaft 13 based on the rotation angle of the nut 41.

Steering Angle Sensor

The steering angle sensor 122 is a sensor that detects a steering angle of a steering wheel (not illustrated) operated by a driver. The steering angle sensor 122 outputs the steering angle to the ECU 130. Besides this, the steering angle sensor 122 may detect a steering angle of the front wheel (not illustrated) which is a main steering wheel and output the steering angle to the ECU 130.

Vehicle Speed Sensor

The vehicle speed sensor 123 is a sensor that detects a body speed (for example, a rotation speed of an output shaft of a transmission) of a vehicle. The vehicle speed sensor 123 outputs the body speed to the ECU 130. Besides this, the vehicle speed sensor 123 may detect a wheel speed and output the wheel speed to the ECU 130.

ECU

The ECU 130 is a controller that electronically controls the extensible actuator 1 and is configured to include a CPU, a ROM, a RAM, various interfaces, an electronic circuit, and the like. The ECU 130 controls the motor 10 (the motor driving circuit 110) and the electromagnetic braking system 60 according to a program stored therein.

Operation of Steering Device and Extensible Actuator

Figure 8:
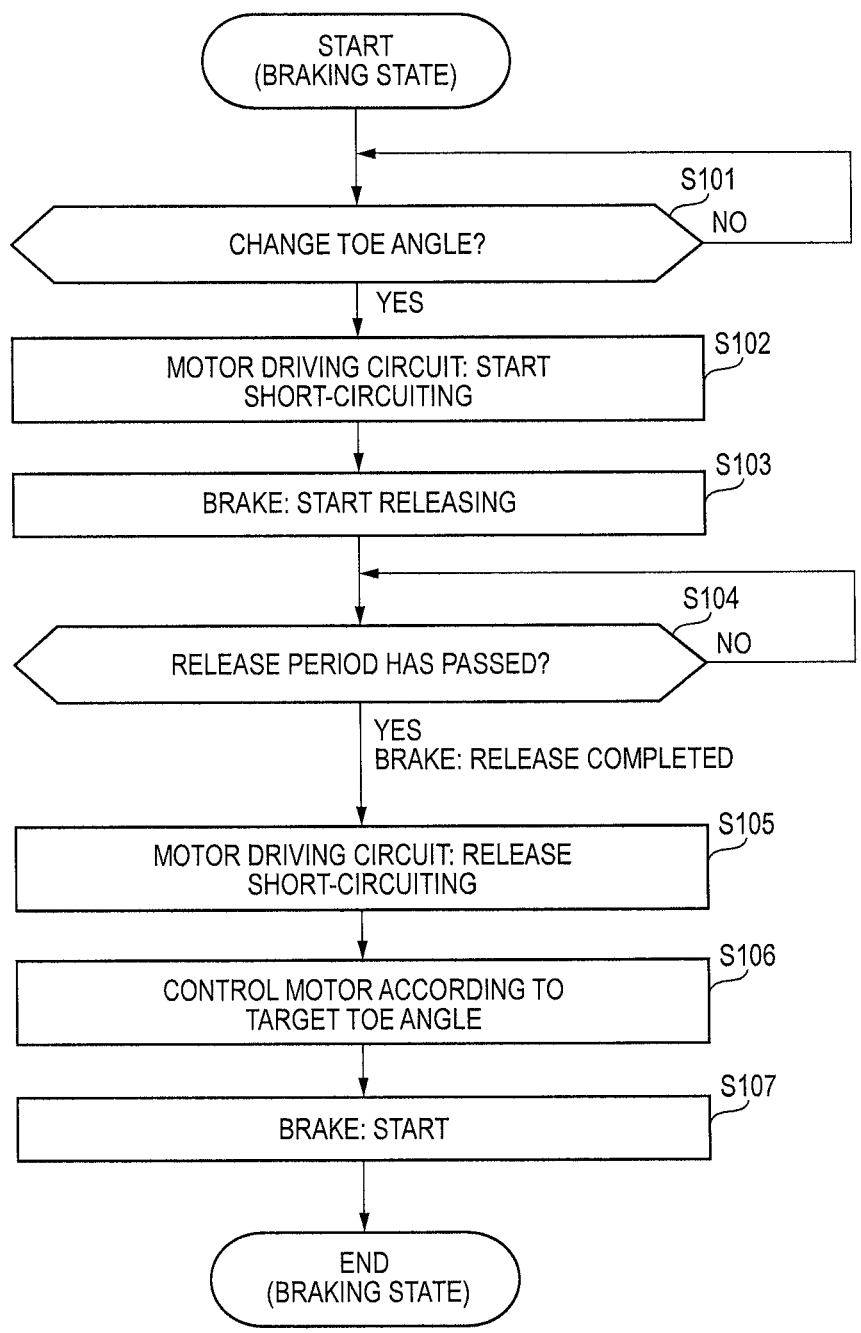
FIG. 8 is a flowchart illustrating the operation of the steering device according to the present embodiment.

Referring to FIG. 8, the operation of the steering device 300 and the extensible actuator 1 and a method of controlling the extensible actuator 1 will be described.

The method of controlling the extensible actuator 1 includes a position holding starting step (S102), a release signal output step (S103), a position holding releasing step (S105), and a rod moving step (S106).

The position holding starting step (S102) is a step of starting position holding control of holding the position of the rod 50. The release signal output step (S103) is a step of outputting a brake release signal (ON-signal of the solenoid 63) to the electromagnetic braking system 60. The position holding releasing step (S105) is a step of releasing the position holding control after the electromagnetic braking system 60 releases brakes. The rod moving step (S106) is a step of driving the motor 10 to move the rod 50.

In the initial state, the electromagnetic braking system 60 is in a braking state. That is, the solenoid 63 is turned off, and the brake shoe 65 biased by the compression coil spring 66 is in close contact with the disc 61.

In step S101, the ECU 130 determines whether the toe angle of the rear wheel 400 is to be changed in order to improve turning ability, vehicle stability, and the like based on the steering angle and the vehicle speed. Here, a method of determining whether the toe angle is to be changed is not particularly limited, and an optional known method can be appropriately used.

When it is determined that the toe angle is to be changed (S101: Yes), the process of the ECU 130 proceeds to step S102. When it is determined that the toe angle is not to be changed (S101: No), the ECU 130 repeatedly performs the determination of step S101.

In step S102, the ECU 130 starts short-circuiting the motor driving circuit 110. Specifically, the ECU 130 turns on the first and second relays 113A and 114A and turns off the third and fourth relays 115A and 116A (see FIG. 7). Besides this, the ECU 130 may turn on the third and fourth relays 115A and 116A and turn off the first and second relays 113A and 114A.

By doing so, as described above, short brake (short braking force) acts on the motor 10. As a result, the rotor 12, the output shaft 13, the worm 20, the worm wheel 30, the nut 41, the screw rod 42, and the rod 50 are held at the present positions.

In step S103, the ECU 130 starts releasing the braking of the electromagnetic braking system 60. Specifically, the ECU 130 outputs an ON-signal (brake release signal) to the solenoid 63 of the electromagnetic braking system 60.

By doing so, the solenoid 63 generates magnetic field, the fixed core 62 is magnetized, and the attractive force (magnetic force) is generated. With this attractive force, the fixed core 62 attracts the movable core 64 and the brake shoe 65 starts being separated from the disc 61.

In step S104, the ECU 130 determines whether a predetermined release period (armature attraction period) has passed after the ON-signal (brake release signal) of the solenoid 63 was output in step S103. The predetermined release period is obtained by tests or the like in advance and is set to a period in which it is determined that the movable core 64 is attracted to the fixed core 62 and the brake shoe 65 is reliably separated from the disc 61.

When it is determined that the predetermined release period has passed (S104: Yes), the process of the ECU 130 proceeds to step S105. When the process proceeds to step S105 in this manner, the release of the braking of the electromagnetic braking system 60 is completed. When it is determined that the predetermined release period has not passed (S104: No), the ECU 130 performs the determination of step S104 again.

In step S105, the ECU 130 releases the short-circuiting of the motor driving circuit 110. Specifically, the ECU 130 turns off the first, second, third, and fourth relays 113A, 114A, 115A, and 116A.

In step S106, the ECU 130 controls the motor 10 according to a target toe angle. Specifically, the ECU 130 controls the motor driving circuit 110 so that the target toe angle is obtained to rotate the motor 10 in a normal or reverse direction. When the present toe angle reaches the target toe angle, the ECU 130 stops the motor 10.

In step S107, the ECU 130 starts braking of the electromagnetic braking system 60. Specifically, the ECU 130 turns off the solenoid 63. By doing so, the brake shoe 65 is pressed against the disc 61 and the braking state is created.

After that, the process of the ECU 130 ends.

Effects of Steering Device and Extensible Actuator

When the solenoid 63 is turned off, the electromagnetic braking system 60 holds the worm 20, and as a result, the rod 50 is prevented from moving in the axial direction easily. In this way, the toe angle of the rear wheel 400 is favorably held.

When the toe angle of the rear wheel 400 is changed (S101: Yes), the motor driving circuit 110 (the motor 10) is short-circuited to release the braking of the electromagnetic braking system 60 (S103 to S104) while the position of the worm 20 (the rod 50) is held (S102 and S105). Thus, even when external force is input to the rod 50 from the rear wheel 400 during the release of the braking of the electromagnetic braking system 60, the rod 50 will not move but be held at the present position. Thus, the toe angle of the rear wheel 400 will not change with external force when the braking of the electromagnetic braking system 60 is released.

Modification

While an embodiment of the present invention has been described, the present invention is not limited to this but may be changed in the following manner.

Figure 9:
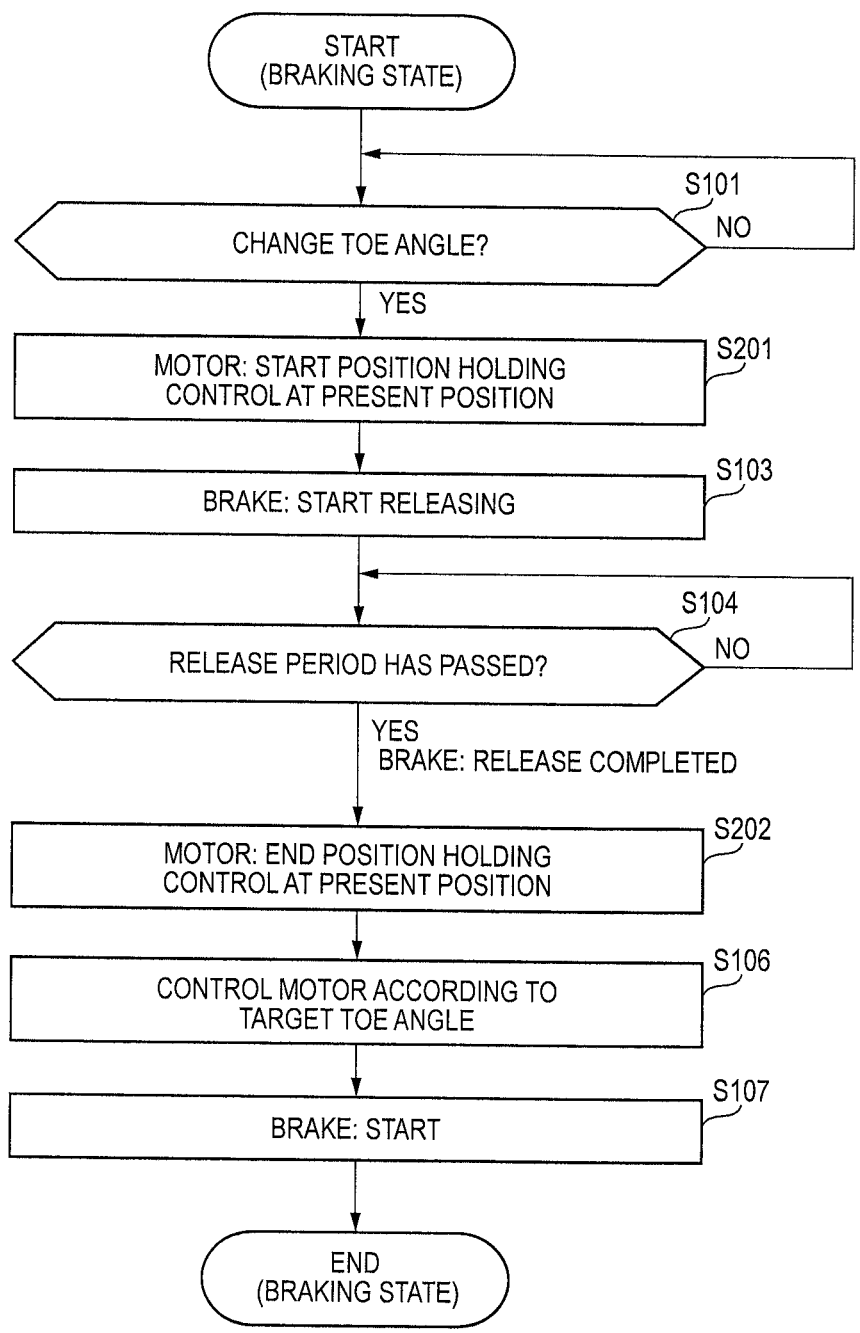
FIG. 9 is a flowchart illustrating the operation of the steering device according to a modification.

As illustrated in FIG. 9, the operation of the extensible actuator 1 may be changed partially. As illustrated in FIG. 9, in the extensible actuator 1 according to the modification, steps S201 and S202 are included instead of steps S102 and S105 of FIG. 8.

In step S201, the ECU 130 starts position holding control of holding the rod 50 at a target position using the present position of the rod 50 as the target position. For example, the ECU 130 sets the present position of the rod 50 at the point in time when the operation has proceeded to step S201 to the target position.

Specifically, when the toe angle changes with external force and the rod 50 moves, the ECU 130 controls the motor driving circuit 110 to rotate the motor 10 in a normal or reverse direction so that the rod 50 returns to the target position.

In step S202, the ECU 130 ends the position holding control having started in step S201.

According to the modification illustrated in FIG. 9, when the toe angle is changed (S101: Yes), since braking of the electromagnetic braking system 60 is released during execution of the position holding control of holding the rod 50 (the output shaft 13 of the motor 10) at the present position (S201 and S202), change in the toe angle due to external force during braking will not remain unchanged forever.

In the embodiment described above, although a configuration in which the electromagnetic braking system 60 is provided in the worm 20 has been illustrated, the position of the electromagnetic braking system 60 is not limited to this. For example, the electromagnetic braking system 60 may be provided in the nut 41 of the ball screw 40, the screw rod 42 of the ball screw 40, or the rod 50.

In the embodiment described above, although a configuration, in which the motor 10 (the motor driving circuit 110) is short-circuited so that the position in the circumferential direction of the worm 20 is held and the position in the axial direction of the rod 50 is held, has been illustrated, a locking piece, for example, may be inserted in the rod 50 so that the position in the axial direction of the rod 50 is held. In this case, the locking piece is attached to a solenoid device (locking device) that reciprocates in the radial direction of the rod 50 and is controlled by the ECU 130. That is, the locking piece may serve to directly hold the rod 50 mechanically.

In the embodiment described above, although a configuration in which the rear wheel 400 is steered by the extensible actuator 1 (the steering device 300) has been illustrated, besides this, for example, the front wheel may be steered. Moreover, the extensible actuator 1 (the steering device 300) may be mounted on a vehicle such as a two-wheel vehicle or a three-wheel vehicle.

In the embodiment described above, although a configuration in which the ball screw 40 is included as a conversion mechanism has been illustrated, besides this, for example, the ball may not be included and a feed screw including a screw rod and a nut may be included. In this case, the screw rod and the nut may be formed using a trapezoidal screw.

In the embodiment described above, although a configuration in which the electromagnetic braking system 60 generates braking force when the solenoid 63 is turned off has been illustrated (see FIG. 5B), besides this, for example, braking force may be generated when the solenoid 63 is turned on.

In the embodiment described above, although a configuration in which a rotational motion of the motor 10 is converted into a reciprocating motion of the rod 50 using a conversion mechanism that includes the worm 20, the worm wheel 30, and the ball screw 40 has been illustrated, this configuration may be changed appropriately. For example, the rod 50 and the motor 10 may be disposed concentrically and the output shaft 13 of the motor 10 may be connected to the nut 41 with a deceleration mechanism (planetary gear mechanism or the like) interposed.

What is claimed is:

1. A method for controlling an extensible actuator, the method comprising the steps of:
   preparing the extensible actuator containing;
     a motor that generates rotating force,
     a rod that freely reciprocates in an axial direction,
     a conversion mechanism that converts the rotating force of the motor into a reciprocating motion of the rod,
     an electromagnetic braking system that brakes the reciprocating motion of the rod, and
     a controller that controls the motor and the electromagnetic braking system,
   starting a position holding control to hold a position of the rod;
   outputting a brake release signal to the electromagnetic braking system;
   releasing the position holding control after braking applied by the electromagnetic braking system is released; and
   driving the motor to move the rod.

2. The method for controlling the extensible actuator according to claim 1, wherein
   the position holding control executes the step of short-circuiting the motor to hold the position of the rod.

3. The method for controlling the extensible actuator according to claim 1, wherein
   the position holding control executes the step of;
   setting a present position of the rod as a target position, and
   operating the motor so that the rod remains at the target position, thereby holding the position of the rod.

4. The method for controlling the extensible actuator according to claim 1, wherein
   in response to the reciprocating motion of the rod, a wheel of a vehicle is steered.

5. An extensible actuator comprising:
   a motor that generates rotating force;
   a rod that freely reciprocates in an axial direction;
   a conversion mechanism that converts the rotating force of the motor into a reciprocating motion of the rod; and
   an electromagnetic braking system that brakes the reciprocating motion of the rod, wherein
   the conversion mechanism includes a worm that is fixed to an output shaft of the motor, a worm wheel that engages with the worm, and a ball screw that converts a rotational motion of the worm wheel into a reciprocating motion of the rod, and
   the ball screw includes a nut that rotates integrally with the worm wheel and a screw rod that reciprocates integrally with the rod in response to the nut rotating.

6. The extensible actuator according to claim 5, further comprising:
   a controller that controls the motor and the electromagnetic braking system, wherein the controller executes the steps of:
     starting a position holding control to hold a position of the rod;
     outputting a brake release signal to the electromagnetic braking system;
     releasing the position holding control after braking applied by the electromagnetic braking system is released; and
     driving the motor to move the rod.

7. A steering device comprising the extensible actuator according to claim 6, wherein in response to the reciprocating motion of the rod, a wheel of a vehicle is steered.

8. A steering device comprising the extensible actuator according to claim 5, wherein in response to the reciprocating motion of the rod, a wheel of a vehicle is steered.

9. An extensible actuator comprising:
   a motor that generates rotating force;
   a rod that freely reciprocates in an axial direction;
   a conversion mechanism that converts the rotating force of the motor into a reciprocating motion of the rod;
   an electromagnetic braking system that brakes the reciprocating motion of the rod; and
   a controller that controls the motor and the electromagnetic braking system, wherein
   the controller executes the steps of:
     starting a position holding control to hold a position of the rod;
     outputting a brake release signal to the electromagnetic braking system;
     releasing the position holding control after braking applied by the electromagnetic braking system is released; and
     driving the motor to move the rod.

10. A steering device comprising the extensible actuator according to claim 9, wherein in response to the reciprocating motion of the rod, a wheel of a vehicle is steered.

* * * * *